United States Patent
Glaser et al.

(10) Patent No.: US 12,291,147 B2
(45) Date of Patent: May 6, 2025

(54) UTILIZING HMI WITH DISTRACTED DRIVER

(71) Applicant: GM Global Technology Operations LLC, Detroit, MI (US)

(72) Inventors: Daniel S. Glaser, Novi, MI (US); Joseph F. Szczerba, Grand Blanc, MI (US); Yi Guo Glaser, Novi, MI (US); Sri Krishna Divya Pemmaraju, Plymouth, MI (US); Michael Alexander Wuergler, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 125 days.

(21) Appl. No.: 18/471,566

(22) Filed: Sep. 21, 2023

(65) Prior Publication Data
US 2025/0100447 A1 Mar. 27, 2025

(51) Int. Cl.
*B60Q 9/00* (2006.01)
(52) U.S. Cl.
CPC .................................. *B60Q 9/00* (2013.01)

(58) Field of Classification Search
CPC ................................ B60W 50/14; B60Q 9/00
See application file for complete search history.

(56) References Cited

U.S. PATENT DOCUMENTS

| | | | |
|---|---|---|---|
| 2016/0165031 A1* | 6/2016 | Gopinath | H04W 8/005 455/569.2 |
| 2019/0357834 A1* | 11/2019 | Aarts | A61B 5/7246 |
| 2023/0241971 A1* | 8/2023 | Kushnerik | B60K 35/00 349/56 |

* cited by examiner

*Primary Examiner* — Omer S Khan
(74) *Attorney, Agent, or Firm* — Vivacqua Crane, PLLC

(57) ABSTRACT

A system for utilizing human machine interfaces to engage at least one passenger when a driver of a vehicle is distracted includes a system controller in communication with a plurality of passenger human machine interfaces and adapted to modify a display screen of a front seat passenger HMI, and an occupant monitoring system adapted to monitor the driver of the vehicle and the at least one passenger within the vehicle, the system controller adapted to determine, with a distracted driver algorithm within the system controller and data from the occupant monitoring system that the driver of the vehicle is distracted, and, when the driver of the vehicle is distracted, to actuate the plurality of passenger HMIs to engage the at least one passenger and encourage the at least one passenger to engage with the driver of the vehicle.

20 Claims, 3 Drawing Sheets

UTILIZING HMI WITH DISTRACTED DRIVER

INTRODUCTION

The present disclosure relates to a system and method for utilizing human machine interfaces for passengers within a vehicle to engage the passengers within the vehicle when a driver of the vehicle is distracted.

Vehicles are equipped with driver monitoring systems that detect when a driver of a vehicle is distracted and provide signals to the driver to pull the driver's attention back to driving the vehicle. Current systems do not engage passengers within the vehicle, prompting passengers within the vehicle to interact with the driver to make sure the driver is properly engaged with driving the vehicle and is not distracted.

Thus, while current systems and methods achieve their intended purpose, there is a need for a new and improved system and method for utilizing human machine interfaces within a vehicle to engage passengers within the vehicle to engage with a distracted driver.

SUMMARY

According to several aspects of the present disclosure, a method of utilizing human machine interfaces within a vehicle to engage at least one passenger within the vehicle when a driver of the vehicle is distracted includes modifying, with a system controller in communication with a plurality of passenger human machine interfaces (HMI), a display screen of a front seat passenger HMI to make the display screen of the front seat passenger HMI visually unclear to a driver of the vehicle, monitoring, with an occupant monitoring system in communication with a plurality of onboard sensors within the vehicle and the system controller, the driver of the vehicle and the at least one passenger within the vehicle, and determining, with a distracted driver algorithm within the system controller and data from the occupant monitoring system that the driver of the vehicle is distracted, and, when the driver of the vehicle is distracted, actuating the plurality of passenger HMIs to engage the at least one passenger and encourage the at least one passenger to engage with the driver of the vehicle.

According to another aspect, the method further includes determining, with the distracted driver algorithm within the system controller and data from the occupant monitoring system that the driver of the vehicle is distracted by the display screen of the front seat passenger HMI, and when the driver is distracted by the display screen of the front seat passenger HMI, modifying audio output from the front seat passenger HMI to reduce the driver's ability to hear the audio output from the front seat passenger HMI.

According to another aspect, the method further includes after modifying audio output from the front seat passenger HMI to reduce the driver's ability to hear the audio output from the front seat passenger HMI, one of determining, with the distracted driver algorithm within the system controller and data from the occupant monitoring system that the driver of the vehicle is distracted by the display screen of the front seat passenger HMI, and actuating the plurality of passenger HMIs to engage the at least one passenger and encourage the at least one passenger to engage with the driver of the vehicle, or determining, with the distracted driver algorithm within the system controller and data from the occupant monitoring system that the driver of the vehicle is no longer distracted by the display screen of the front seat passenger HMI, and restoring audio output from the front seat passenger HMI.

According to another aspect, the actuating the plurality of passenger HMIs to engage the at least one passenger and encourage the at least one passenger to engage with the driver of the vehicle further includes reducing the quality of audio output and video output from all of the plurality of passenger HMIs.

According to another aspect, the actuating the plurality of passenger HMIs to engage the at least one passenger and encourage the at least one passenger to engage with the driver of the vehicle further includes, after reducing the quality of audio and video output from all of the plurality of passenger HMIs, monitoring the driver and the at least one passenger with the occupant monitoring system, and displaying, with the system controller, on each one of the plurality of passenger HMIs, a message indicating that the driver of the vehicle is distracted when one of the system controller determines, with data from the occupant monitoring system that the at least one passenger has interacted with the driver of the vehicle, and the system controller determines, with the distracted driver algorithm within the system controller and data from the occupant monitoring system that the driver of the vehicle remains distracted, or the system controller determines, with data from the occupant monitoring system that the at least one passenger has not interacted with the driver of the vehicle.

According to another aspect, the method further includes restoring the quality of audio and video output from all of the plurality of passenger HMIs when the system controller determines, with data from the occupant monitoring system that the at least one passenger has interacted with the driver of the vehicle, and the system controller determines, with the distracted driver algorithm within the system controller and data from the occupant monitoring system that the driver of the vehicle is no longer distracted.

According to another aspect, the actuating the plurality of passenger HMIs to engage the at least one passenger and encourage the at least one passenger to engage with the driver of the vehicle further includes, after displaying, with the system controller, on each one of the plurality of passenger HMIs, a message indicating that the driver of the vehicle is distracted, monitoring the driver and the at least one passenger with the occupant monitoring system, and pausing, with the system controller, audio and video output from each one of the plurality of passenger HMIs when one of the system controller determines, with data from the occupant monitoring system that the at least one passenger has interacted with the driver of the vehicle, and the system controller determines, with the distracted driver algorithm within the system controller and data from the occupant monitoring system that the driver of the vehicle remains distracted, or the system controller determines, with data from the occupant monitoring system that the at least one passenger has not interacted with the driver of the vehicle.

According to another aspect, the method further includes removing the message indicating that the driver of the vehicle is distracted and resuming audio and video output from all of the plurality of passenger HMIs when the system controller determines, with data from the occupant monitoring system that the at least one passenger has interacted with the driver of the vehicle, and the system controller determines, with the distracted driver algorithm within the system controller and data from the occupant monitoring system that the driver of the vehicle is no longer distracted.

According to another aspect, the actuating the plurality of passenger HMIs to engage the at least one passenger and encourage the at least one passenger to engage with the driver of the vehicle further includes, after pausing, with the system controller, audio and video output from each one of the plurality of passenger HMIs, monitoring the driver and the at least one passenger with the occupant monitoring system, and providing, with the system controller, via at least one haptic alert device within the vehicle, a haptic alert for the at least one passenger when one of the system controller determines, with data from the occupant monitoring system that the at least one passenger has interacted with the driver of the vehicle, and the system controller determines, with the distracted driver algorithm within the system controller and data from the occupant monitoring system that the driver of the vehicle remains distracted, or the system controller determines, with data from the occupant monitoring system that the at least one passenger has not interacted with the driver of the vehicle.

According to another aspect, the method further includes resuming audio and video output from all of the plurality of passenger HMIs when the system controller determines, with data from the occupant monitoring system that the at least one passenger has interacted with the driver of the vehicle, and the system controller determines, with the distracted driver algorithm within the system controller and data from the occupant monitoring system that the driver of the vehicle is no longer distracted.

According to another aspect, the method further includes providing, with the system controller, the haptic alert continuously until the system controller determines, with the distracted driver algorithm within the system controller and data from the occupant monitoring system that the driver of the vehicle is no longer distracted.

According to several aspects of the present disclosure, a system for utilizing human machine interfaces within a vehicle to engage at least one passenger within the vehicle when a driver of the vehicle is distracted includes a system controller in communication with a plurality of passenger human machine interfaces (HMI) and adapted to modify a display screen of a front seat passenger HMI to make the display screen of the front seat passenger HMI visually unclear to a driver of the vehicle, and an occupant monitoring system in communication with a plurality of onboard sensors within the vehicle and the system controller and adapted to monitor the driver of the vehicle and the at least one passenger within the vehicle, the system controller adapted to determine, with a distracted driver algorithm within the system controller and data from the occupant monitoring system that the driver of the vehicle is distracted, and, when the driver of the vehicle is distracted, to actuate the plurality of passenger HMIs to engage the at least one passenger and encourage the at least one passenger to engage with the driver of the vehicle.

According to another aspect, the system controller is further adapted to determine, with the distracted driver algorithm and data from the occupant monitoring system that the driver of the vehicle is distracted by the display screen of the front seat passenger HMI, and modify audio output from the front seat passenger HMI to reduce the driver's ability to hear the audio output from the front seat passenger HMI when the driver is distracted by the display screen of the front seat passenger HMI.

According to another aspect, after modifying audio output from the front seat passenger HMI to reduce the driver's ability to hear the audio output from the front seat passenger HMI, the system controller is further adapted to one of actuate the plurality of passenger HMIs to engage the at least one passenger and encourage the at least one passenger to engage with the driver of the vehicle when the system controller determines, with the distracted driver algorithm and data from the occupant monitoring system, that the driver of the vehicle is distracted by the display screen of the front seat passenger HMI, or restore audio output from the front seat passenger HMI when the system controller determines, with the distracted driver algorithm and data from the occupant monitoring system, that the driver of the vehicle is no longer distracted by the display screen of the front seat passenger HMI.

According to another aspect, when actuating the plurality of passenger HMIs to engage the at least one passenger and encourage the at least one passenger to engage with the driver of the vehicle, the system controller is further adapted to reduce the quality of audio output and video output from all of the plurality of passenger HMIs.

According to another aspect, after reducing the quality of audio and video output from all of the plurality of passenger HMIs, the system controller is further adapted to monitor the driver and the at least one passenger with the occupant monitoring system, and one of display on each one of the plurality of passenger HMIs, a message indicating that the driver of the vehicle is distracted when the system controller determines, with data from the occupant monitoring system that the at least one passenger has interacted with the driver of the vehicle, and the system controller determines, with the distracted driver algorithm and data from the occupant monitoring system that the driver of the vehicle remains distracted, or display on each one of the plurality of passenger HMIs, a message indicating that the driver of the vehicle is distracted when the system controller determines, with data from the occupant monitoring system that the at least one passenger has not interacted with the driver of the vehicle, or restore the quality of audio and video output from all of the plurality of passenger HMIs when the system controller determines, with data from the occupant monitoring system that the at least one passenger has interacted with the driver of the vehicle, and the system controller determines, with the distracted driver algorithm and data from the occupant monitoring system that the driver of the vehicle is no longer distracted.

According to another aspect, after displaying, with the system controller, on each one of the plurality of passenger HMIs, a message indicating that the driver of the vehicle is distracted, the system controller is further adapted to monitor the driver and the at least one passenger with the occupant monitoring system, and one of pause audio and video output from each one of the plurality of passenger HMIs when the system controller determines, with data from the occupant monitoring system that the at least one passenger has interacted with the driver of the vehicle, and the system controller determines, with the distracted driver algorithm and data from the occupant monitoring system that the driver of the vehicle remains distracted, or pause audio and video output from each one of the plurality of passenger HMIs when the system controller determines, with data from the occupant monitoring system that the at least one passenger has not interacted with the driver of the vehicle, or remove the message indicating that the driver of the vehicle is distracted and resume audio and video output from all of the plurality of passenger HMIs when the system controller determines, with data from the occupant monitoring system that the at least one passenger has interacted with the driver of the vehicle, and the system controller determines, with the distracted driver algorithm and data from the occupant monitoring system that the driver of the vehicle is no longer distracted.

According to another aspect, after pausing, with the system controller, audio and video output from each one of the plurality of passenger HMIs the system controller is further adapted to monitor the driver and the at least one passenger with the occupant monitoring system, and one of provide, via at least one haptic alert device within the vehicle, a haptic alert for the at least one passenger when the system controller determines, with data from the occupant monitoring system that the at least one passenger has interacted with the driver of the vehicle, and the system controller determines, with the distracted driver algorithm and data from the occupant monitoring system that the driver of the vehicle remains distracted, or provide, via the at least one haptic alert device within the vehicle, a haptic alert for the at least one passenger when the system controller determines, with data from the occupant monitoring system that the at least one passenger has not interacted with the driver of the vehicle, or resume audio and video output from all of the plurality of passenger HMIs when the system controller determines, with data from the occupant monitoring system that the at least one passenger has interacted with the driver of the vehicle, and the system controller determines, with the distracted driver algorithm and data from the occupant monitoring system that the driver of the vehicle is no longer distracted.

According to another aspect, the system controller is further adapted to provide the haptic alert continuously until the system controller determines, with the distracted driver algorithm and data from the occupant monitoring system, that the driver of the vehicle is no longer distracted.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
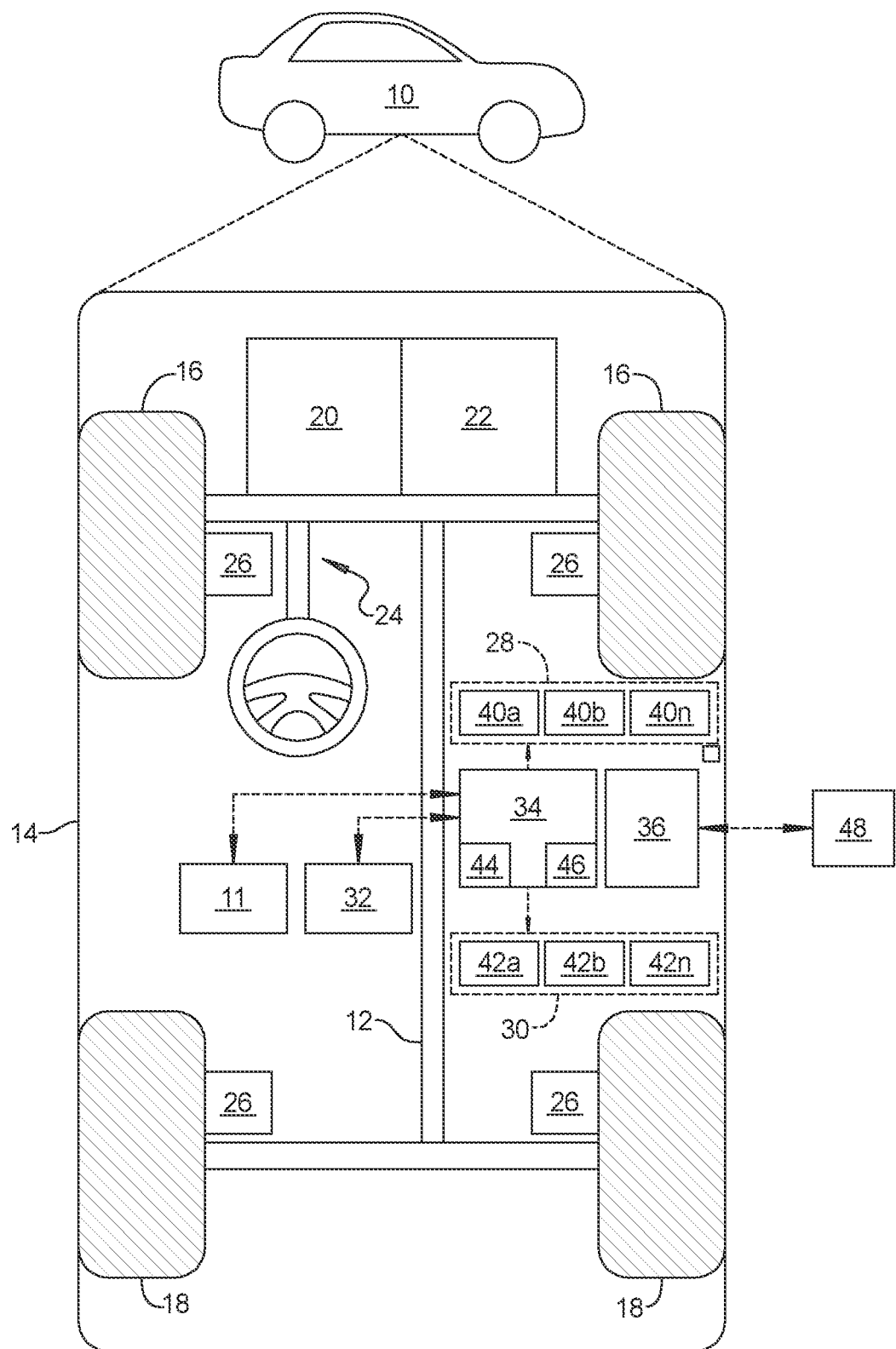
FIG. 1 is a schematic diagram of a vehicle having a system for utilizing human machine interfaces within a vehicle to engage passengers within the vehicle to engage with a distracted driver according to an exemplary embodiment.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

In accordance with an exemplary embodiment, FIG. 1 shows a vehicle 10 with an associated system 11 for utilizing human machine interfaces within a vehicle 10 to engage at least one passenger within the vehicle 10 when a driver of the vehicle 10 is distracted in accordance with various embodiments. In general, the system 11 works in conjunction with other systems within the vehicle 10 to display various information and infotainment content for the passenger. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 11 is incorporated into the autonomous vehicle 10. An autonomous vehicle 10 is, for example, a vehicle 10 that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is equipped with a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. The novel aspects of the present disclosure are also applicable to non-autonomous vehicles.

As shown, the vehicle 10 generally includes a propulsion system 20, a transmission system 22, a steering system 24, a brake system 26, a sensor system 28, an actuator system 30, at least one data storage device 32, a vehicle controller 34, and a wireless communication module 36. In an embodiment in which the vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image or map. The plurality of sensing devices 40a-40n is used to determine information about an environment surrounding the vehicle 10. In an exemplary embodiment, the plurality of sensing devices 40a-40n includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor. In another exemplary embodiment, the plurality of sensing devices 40a-40n further includes sensors to determine information about the environment surrounding the vehicle 10, for example, an ambient air temperature sensor, a barometric pressure sensor, and/or a photo and/or video camera which is positioned to view the environment in front of the vehicle 10. In another exemplary embodiment, at least one of the plurality of sensing devices 40a-40n is capable of measuring distances in the environment surrounding the vehicle 10.

In a non-limiting example wherein the plurality of sensing devices 40a-40n includes a camera 38, the plurality of sensing devices 40a-40n measures distances using an image processing algorithm configured to process images from the camera and determine distances between objects. In another non-limiting example, the plurality of vehicle sensors 40a-40n includes a stereoscopic camera having distance measurement capabilities. In one example, at least one of the plurality of sensing devices 40a-40n is affixed inside of the vehicle 10, for example, in a headliner of the vehicle 10, having a view through the windshield of the vehicle 10. In another example, at least one of the plurality of sensing devices 40a-40n is a camera affixed outside of the vehicle 10, for example, on a roof of the vehicle 10, having a view of the environment surrounding the vehicle 10 and adapted to collect information (images) related to the environment outside the vehicle 10. It should be understood that various additional types of sensing devices, such as, for example, LiDAR sensors, ultrasonic ranging sensors, radar sensors, and/or time-of-flight sensors are within the scope of the present disclosure. The actuator system 30 includes one or more actuator devices 42a-42n that control one or more vehicle 10 features such as, but not limited to, the propulsion system 20, the transmission system 22, the steering system 24, and the brake system 26.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the vehicle controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The wireless communication module 36 is configured to wirelessly communicate information to and from other remote entities 48, such as but not limited to, other vehicles ("V2V" communication,) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figure 2:
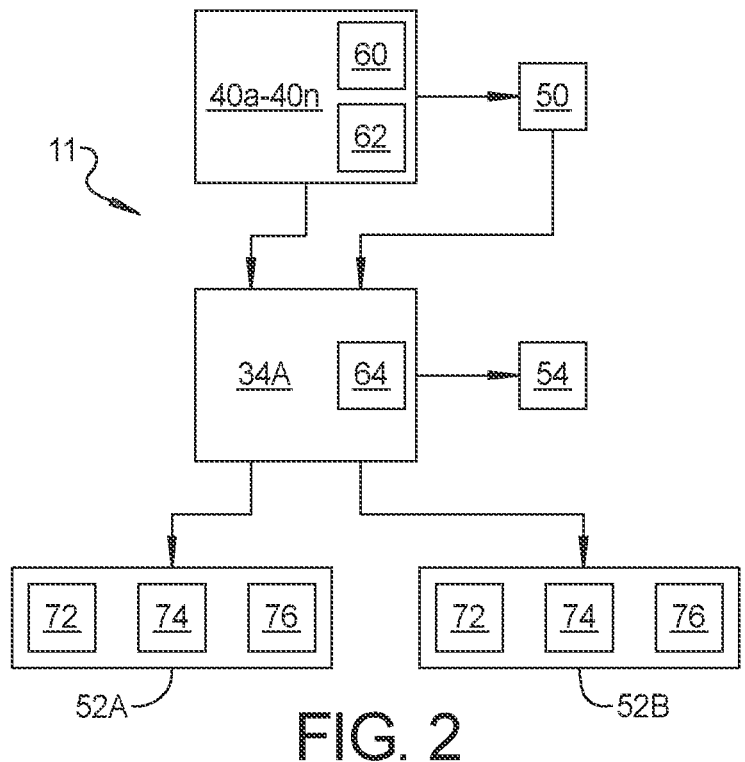
FIG. 2 is a schematic diagram of the system according to an exemplary embodiment.

Referring to FIG. 2 a schematic diagram of the system 11 is shown. The system 11 includes a system controller 34A in communication with the plurality of sensing devices (onboard sensors) 40a-40n. The system controller 34A may be the vehicle controller 34, or the system controller 34A may be a separate controller in communication with the vehicle controller 34. In addition to the plurality of onboard sensors 40a-40n, the system controller 34A is in communication with an occupant monitoring system 50, a plurality of passenger human machine interfaces (HMIs) 52, and at least one haptic device 54.

In an exemplary embodiment, the occupant monitoring system 50 is adapted to monitor the driver 56 and passengers 58 within the vehicle 10. The occupant monitoring system 50 watches the driver 56 and passengers 58 within the vehicle 10 with cameras 60, microphones 62 and other sensors placed strategically within the interior of the vehicle 10. These cameras 60 can capture images of the face, eyes, and head position, of both the driver 56 and passengers 58 within the vehicle 10, while other sensors may monitor steering wheel movements, pedal usage, and even vital signs like heart rate. As is known in the industry, the occupant monitoring system 50 collects data that is continuously analyzed in real-time by a distracted driver algorithm 64 within the system controller 34A. Advanced image recognition and machine learning algorithms are employed by the distracted driver algorithm 64 to detect signs of distraction, drowsiness, or impairment of the driver 56.

Figure 3:
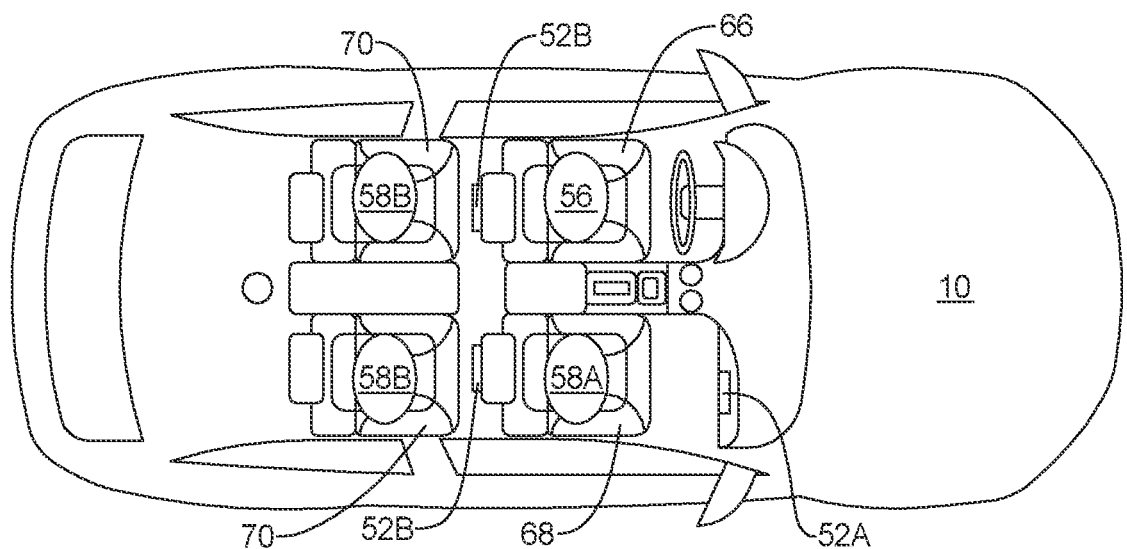
FIG. 3 is a top-down schematic view of vehicle having a system according to an exemplary embodiment.

Each of the plurality of passenger HMIs is adapted to provide infotainment content (audio and video) for passengers within the vehicle 10. Referring to FIG. 3, an example of a vehicle 10 having a system 11 in accordance with the present disclosure is shown, wherein the vehicle includes a driver seat 66 for a driver 56 of the vehicle 10, a front passenger seat 68 for a front passenger 58A of the vehicle 10, and two rear passenger seats 70 for two rear passengers 58B of the vehicle 10. The vehicle 10 includes three passenger HMIs 52. A front passenger HMI 52A is positioned for viewing and interaction by the front passenger 70, and two rear passenger HMIs 52B are positioned for viewing and interaction by the rear passengers 58B.

In an exemplary embodiment, each of the passenger HMIs 52A, 52B includes a touch screen display 72 adapted to display images and video and to allow a passenger 58A, 58B to input information to the system 11 by touching the touch screen display 72, a microphone 74 adapted to receive verbal input from the passengers 58A, 58B, and a speaker 76 adapted to provide audio output for the passengers 58A, 58B.

In an exemplary embodiment, the system controller 34A is adapted to modify a display screen (the touch screen display 72) of the front seat passenger HMI 52A to make the display screen 72 of the front seat passenger HMI 52A visually unclear to the driver 56 of the vehicle 10. Making the display screen 72 of the front seat passenger HMI 52A visually unclear may include reducing a brightness of the front seat passenger HMI 52A, or implementing features of the touch screen display 72 to make images displayed thereon out of focus when viewed from an angle, wherein, when the driver 56 looks over at the front seat passenger HMI 52A, images displayed thereon will be out of focus, but when the front seat passenger 58A views the front seat passenger HMI 52A, the images displayed thereon will be clear.

This measure is designed to deter the driver 56 from viewing or interacting with the front passenger seat HMI 52A while the driver 56 is driving the vehicle 10. The occupant monitoring system 50 is in communication with the plurality of onboard sensors 40a-40n within the vehicle 10 and the system controller 34A, and is adapted to monitor the driver 56 of the vehicle 10 and the at least one passenger 58A, 58B within the vehicle 10.

In an exemplary embodiment, when the system controller 34A, with the distracted driver algorithm 64 within the system controller 34A and data from the occupant monitoring system 50 determines that the driver 56 of the vehicle 10 is distracted, the system controller is further adapted to actuate the plurality of passenger HMIs 52A, 52B to engage the at least one passenger 58A, 58B and encourage the at least one passenger 58A, 58B to engage with the driver 56 of the vehicle. This measure is intended to recruit the passengers 58A, 58B within the vehicle 10 to actively participate in keeping the driver 56 focused while driving the vehicle 10.

The system controller 34A, along with the distracted driver algorithm 64, will consider a driver 56 "distracted" any time the driver 56 is not in a condition to safely operate the vehicle 10. For example, a distracted driver 56 may be a driver 56 that is distracted in the traditional sense, wherein the driver 56 is looking away from the road, eating, drinking, having a discussion with another passenger 58A, 58B, etc. A distracted driver 56 could also be a driver 56 that is displaying fatigue or unresponsiveness. In an exemplary embodiment, the plurality of onboard sensors 40a-40n includes physiological sensors to monitor physical/medical conditions of the driver 56, wherein the system controller 34A may consider the driver 56 distracted for purposes of the system 11 when physiological sensors indicate that the driver 56 is experiencing a physical/medical condition that makes the driver 56 unfit to safely operate the vehicle 10. For example, physiological sensors within the vehicle 10 may detect increased heart rate or palpitations and determine that the driver 56 may be having a heart attack, and thus consider the driver distracted and triggering action by the system 11 to engage the at least one passenger 58A, 58B.

Further, when determining if the driver 56 is distracted, the system controller 34A uses a centralized risk calculator within the system controller 34A which receives input from the plurality of onboard sensors 40a-40n, including internal sensors that provide information related to, for example, but not limited to, the driver state, driving behavior and physiological conditions of the driver 56, external sensors that provide information related to, for example, but not limited to, weather conditions, time of day, and road conditions/complexity along with information received from cloud-based resources and infrastructure systems that provide information related to, for example, but not limited to, traffic conditions, road conditions, and construction. The system controller 34A, using the centralized risk calculator, can adjust thresholds used to determine when a driver is considered "distracted", and thus, when the system 11 initiates engagement of the at least one passenger 58A, 58B when the centralized risk calculator determines that driving risk is increased due to, for example, but not limited to, heavy traffic, poor weather conditions, etc.

In another exemplary embodiment, when the system controller 34A, with the distracted driver algorithm 64 and data from the occupant monitoring system 50 determines that the driver 56 of the vehicle 10 is distracted by the display screen 72 of the front seat passenger HMI 52A, the system controller 34A is adapted to modify audio output from the front seat passenger HMI 52A to reduce the driver's ability to hear the audio output from the front seat passenger HMI 52A. Such modification may include reducing a volume of the audio output from the speaker 76 of the front seat passenger HMI 52A, or implementing techniques known in the industry to direct audio output from the speaker 76 of the front seat passenger HMI 52A to the front seat passenger 58A making it difficult for the driver 56 to hear the audio output from the speaker 76 of the front seat passenger HMI 52A and deterring the driver 56 from being distracted by the front seat passenger HMI 52A.

If, after modifying audio output from the front seat passenger HMI 52A to reduce the driver's 56 ability to hear the audio output from the front seat passenger HMI 52A, the system controller 34A determines, with the distracted driver algorithm 64 and data from the occupant monitoring system 50, that the driver 56 of the vehicle 10 is still distracted by the display screen 72 of the front seat passenger HMI 52A, then the system controller is further adapted to actuate the plurality of passenger HMIs 52A, 52B to engage the at least one passenger 58A, 58B and encourage the at least one passenger 58A, 58B to engage with the driver 56 of the vehicle 10.

If, after modifying audio output from the front seat passenger HMI 52A to reduce the driver's 56 ability to hear the audio output from the front seat passenger HMI 52A, the system controller 34A determines, with the distracted driver algorithm 64 and data from the occupant monitoring system 50, that the driver 56 of the vehicle 10 is no longer distracted by the display screen 72 of the front seat passenger HMI 52A, the system controller 34A is further adapted to restore audio output from the front seat passenger HMI 52A.

In an exemplary embodiment, when actuating the plurality of passenger HMIs 52A, 52B to engage the at least one passenger 58A, 58B and encourage the at least one passenger 58A, 58B to engage with the driver 56 of the vehicle 10, the system controller 34A is further adapted to reduce the quality of audio output and video output from all of the plurality of passenger HMIs 52A, 52B. This measure is meant to catch the attention of the passengers 58A, 58B by interfering with the audio and video output from the passenger HMIs 52A, 52B, which in turn will encourage the passengers 58A, 58B to engage with the driver 56, knowing that keeping the driver 56 focused will prevent further interference with the audio and video output from the passenger HMIs 52A, 52B.

After reducing the quality of audio and video output from all of the plurality of passenger HMIs 52A, 52B, the system controller 34A is further adapted to monitor the driver 56 and the at least one passenger 58A, 58B with the occupant monitoring system 50.

If, after reducing the quality of audio and video output from all of the plurality of passenger HMIs 52A, 52B, the system controller 34A determines, with data from the occupant monitoring system 50 that the at least one passenger 58A, 58B has interacted with the driver 56 of the vehicle 10, and the system controller 34A determines, with the distracted driver algorithm 64 and data from the occupant monitoring system 50 that the driver 56 of the vehicle 10 remains distracted, then, the system controller 34A is adapted to display on each one of the plurality of passenger HMIs 52A, 52B, a message 78 indicating that the driver 56 of the vehicle 10 is distracted.

The system controller 34A uses the occupant monitoring system 50 to verify that one of the passengers 58A, 58B did engage with the driver 56. The occupant monitoring system 50, using the camera 60, may detect movement or gestures by the at least one passenger 58A, 58B, such as the at least one passenger 58A, 58B reaching out to touch the shoulder of the driver 56, or using the microphone 62, the occupant monitoring system may detect that the at least one passenger 58A, 58B talked to the driver 56. If however, despite engagement by one or more of the passengers 58A, 58B, the system controller 34A determines the driver 56 is still distracted, then the message 78 is displayed.

Figure 4:
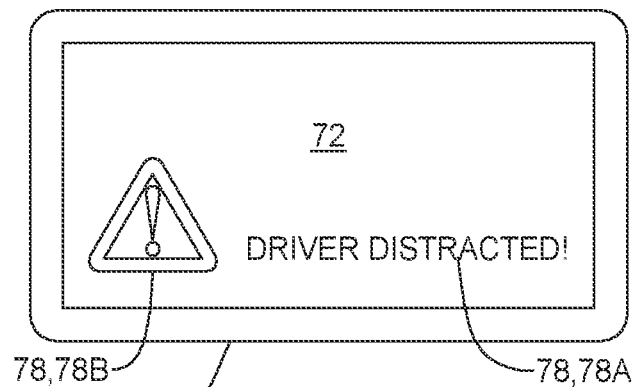
FIG. 4 is schematic perspective view of a human machine interface with a message displayed thereon.

Referring to FIG. 4, the message 78 may include one or both of a textual message 78A and a graphic 78B, wherein the textual message 78A and/or graphic 78B are intended to catch the passenger's 58A, 58B attention, and cause the passengers 58A, 58B to engage with the driver 58. The audio and video output from the passenger HMIs 52A, 52B will continue while the message 78 is displayed on the touch screen display 72 of each of the passenger HMIs 52A, 52B, overlayed onto the video output.

If, after reducing the quality of audio and video output from all of the plurality of passenger HMIs 52A, 52B, the system controller 34A determines, with data from the occupant monitoring system 50 that the at least one passenger 58A, 58B has not interacted with the driver 56 of the vehicle 10, then, the system controller 34A is adapted to display on each one of the plurality of passenger HMIs 52A, 52B, the message 78, as shown in FIG. 4, indicating that the driver 56 of the vehicle 10 is distracted. If reducing the quality of the audio and video does not successfully prompt any of the passengers 58A, 58B to engage with the driver 56, then the system controller 34A will step-up efforts to engage the passengers 58A, 58B by displaying the message 78 on each of the plurality of passenger HMIs 52A, 52B.

If, after reducing the quality of audio and video output from all of the plurality of passenger HMIs 52A, 52B, the system controller 34A determines, with data from the occupant monitoring system 50 that the at least one passenger 58A, 58B has interacted with the driver 56 of the vehicle 10, and the system controller 34A determines, with the distracted driver algorithm 64 and data from the occupant monitoring system 50 that the driver 56 of the vehicle 10 is no longer distracted, then, the system controller 34A is adapted to restore the quality of audio and video output from all of the plurality of passenger HMIs 52A, 52B.

After displaying, with the system controller 34A, on each one of the plurality of passenger HMIs 52A, 52B, the message 78 indicating that the driver 56 of the vehicle 10 is distracted, the system controller 34A is further adapted to monitor the driver 56 and the at least one passenger 58A, 58B with the occupant monitoring system 50.

If the system controller 34A determines, with data from the occupant monitoring system 50 that the at least one passenger 58A, 58B has interacted with the driver 56 of the vehicle 10, and the system controller 34A determines, with the distracted driver algorithm 64 and data from the occupant monitoring system 50 that the driver 56 of the vehicle 10 is still distracted, the system controller is further adapted to pause audio and video output from each one of the plurality of passenger HMIs 52A, 52B.

The system controller 34A uses the occupant monitoring system 50 to verify that one of the passengers 58A, 58B did engage with the driver 56. If however, despite engagement by one or more of the passengers 58A, 58B, the system controller 34A determines the driver 56 is still distracted, then the audio and video output from each one of the plurality of passenger HMIs 52A, 52B is paused. The message 78 previously displayed may remain on the screen, as shown in FIG. 4, any video being displayed will be paused and no audio will broadcast from the speakers 76.

If the system controller 34A determines, with data from the occupant monitoring system 50 that the at least one passenger 58A, 58B has not interacted with the driver 56 of the vehicle 10, then, the system controller 34A is further adapted to pause audio and video output from each one of the plurality of passenger HMIs 52A, 52B.

If the system controller 34A determines, with data from the occupant monitoring system 50 that the at least one passenger 58A, 58B has interacted with the driver 56 of the vehicle 10, and the system controller 34A determines, with the distracted driver algorithm 64 and data from the occupant monitoring system 50 that the driver 56 of the vehicle 10 is no longer distracted, the system controller 34A is further adapted to remove the message 78 indicating that the driver 56 of the vehicle 10 is distracted and resume audio and video output from all of the plurality of passenger HMIs 52A, 52B.

In an exemplary embodiment, after pausing, with the system controller 34A, audio and video output from each one of the plurality of passenger HMIs 52A, 52B the system controller 34A is further adapted to monitor the driver 56 and the at least one passenger 58A, 58B with the occupant monitoring system 50.

If the system controller 34A determines, with data from the occupant monitoring system 50 that the at least one passenger 58A, 58B has interacted with the driver 56 of the vehicle 10, and the system controller 34A determines, with the distracted driver algorithm 64 and data from the occupant monitoring system 50 that the driver 56 of the vehicle 10 remains distracted, then, the system controller 34A is further adapted to provide, via at least one haptic alert device 54 within the vehicle 10, a haptic alert for the at least one passenger 58A, 58B.

The haptic device 54 may be any known device for providing haptic alerts within a vehicle, such as, by way of non-limiting examples, a buzzer or chime, or vibration of the passenger seat 68, 70, or vibration of a seatbelt. Such haptic alert is meant to provide a more intrusive signal to get the attention of the at least one passenger 58A, 58B to prompt the at least one passenger 58A, 58B to engage with the distracted driver 56.

If the system controller 34A determines, with data from the occupant monitoring system 50 that the at least one passenger 58A, 58B has not interacted with the driver 56 of the vehicle 10, then, the system controller 34A is further adapted to provide, via the at least one haptic alert device 54 within the vehicle 10, a haptic alert for the at least one passenger 58A, 58B. If pausing the audio and video output from each one of the plurality of passenger HMIs 52A, 52B does not successfully prompt any of the passengers 58A, 58B to engage with the distracted driver 56, then the system controller 34A will step-up efforts to engage the at least one passenger 58A, 58B by providing the haptic alert in conjunction with pausing the audio and video output of each of the passenger HMIs 52A, 52B and displaying the message 78.

If the system controller 34A determines, with data from the occupant monitoring system 50 that the at least one passenger 58A, 58B has interacted with the driver 56 of the vehicle 10, and the system controller 34A determines, with the distracted driver algorithm 64 and data from the occupant monitoring system 50 that the driver 56 of the vehicle 10 is no longer distracted, then, the system controller 34A is further adapted to resume audio and video output from all of the plurality of passenger HMIs 52A, 52B, and remove the displayed message 78.

In an exemplary embodiment, the system controller 34A is further adapted to provide the haptic alert continuously until the system controller 34A determines, with the distracted driver algorithm 64 and data from the occupant monitoring system 50, that the driver 56 of the vehicle 10 is no longer distracted.

Figure 5:
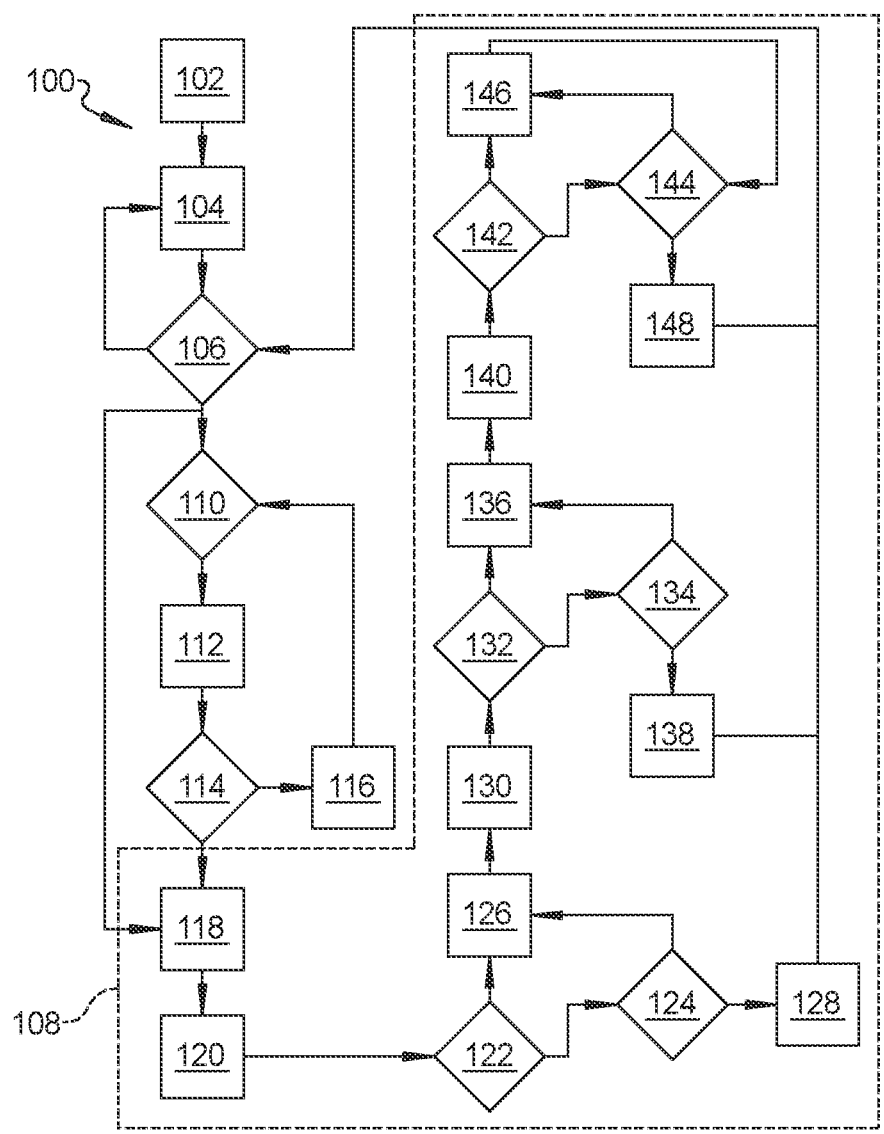
FIG. 5 is a flow chart illustrating a method according to an exemplary embodiment of the present disclosure.

Referring to FIG. 5, a method 100 of utilizing human machine interfaces 52A, 52B within a vehicle 10 to engage at least one passenger 58A, 58B within the vehicle 10 when a driver 56 of the vehicle 10 is distracted includes, beginning at block 102, modifying, with a system controller 34A in communication with a plurality of passenger human machine interfaces (HMI) 52A, 52B, a display screen 72 of a front seat passenger HMI 52A to make the display screen 72 of the front seat passenger HMI 52A visually unclear to a driver 56 of the vehicle 10, moving to block 104, monitoring, with an occupant monitoring system 50 in communication with a plurality of onboard sensors 40a-40n within the vehicle 10 and the system controller 34A, the driver 56 of the vehicle 10 and the at least one passenger 58A, 58B within the vehicle 10, moving to block 106, determining, with a distracted driver algorithm 64 within the system controller 34A and data from the occupant monitoring system 50 that the driver 56 of the vehicle 10 is distracted, and, when the driver 56 of the vehicle 10 is distracted at block 106, moving to block 108, actuating the plurality of passenger HMIs 52A, 52B to engage the at least one passenger 58A, 58B and encourage the at least one passenger 58A, 58B to engage with the driver 56 of the vehicle 10.

In an exemplary embodiment, the method 100 further includes, moving from block 106 to block 110, determining, with the distracted driver algorithm 64 within the system controller 34A and data from the occupant monitoring system 50 that the driver 56 of the vehicle 10 is distracted by the display screen 72 of the front seat passenger HMI 52A, and, when the driver 56 is distracted by the display screen 72 of the front seat passenger HMI 52A, at block 110, moving to block 112, modifying audio output from the front seat passenger HMI 52A to reduce the driver's 56 ability to hear the audio output from the front seat passenger HMI 52A.

In an exemplary embodiment, after modifying audio output from the front seat passenger HMI 52A to reduce the driver's 56 ability to hear the audio output from the front seat passenger HMI 52A, at block 112, the method further includes, moving to block 114, determining, with the distracted driver algorithm 64 within the system controller 34A and data from the occupant monitoring system 50 that the driver 56 of the vehicle 10 is still distracted by the display screen 72 of the front seat passenger HMI 52A, and, moving to block 108, actuating the plurality of passenger HMIs 52A, 52B to engage the at least one passenger 58A, 58B and encourage the at least one passenger 58A, 58B to engage with the driver 56 of the vehicle 10.

In another exemplary embodiment, after modifying audio output from the front seat passenger HMI 52A to reduce the driver's 56 ability to hear the audio output from the front seat passenger HMI 52A, at block 112, the method further includes, moving to block 114, determining, with the distracted driver algorithm 64 within the system controller 34A and data from the occupant monitoring system 50 that the driver 56 of the vehicle 10 is no longer distracted by the display screen 72 of the front seat passenger HMI 52A, and, moving to block 116, restoring audio output from the front seat passenger HMI 52A.

In an exemplary embodiment, the actuating the plurality of passenger HMIs 52A, 52B to engage the at least one passenger 58A, 58B and encourage the at least one passenger 58A, 58B to engage with the driver 56 of the vehicle 10 further includes, moving to block 118, reducing the quality of audio output and video output from all of the plurality of passenger HMIs 52A, 52B.

In another exemplary embodiment, the actuating the plurality of passenger HMIs 52A, 52B to engage the at least one passenger 58A, 58B and encourage the at least one passenger 58A, 58B to engage with the driver 56 of the vehicle 10 at block 108, further includes, after reducing the quality of audio and video output from all of the plurality of passenger HMIs 52A, 52B at block 118, moving to block 120, monitoring the driver 56 and the at least one passenger 58A, 58B with the occupant monitoring system 50.

When the system controller 34A determines, with data from the occupant monitoring system 50 that the at least one passenger 58A, 58B has interacted with the driver 56 of the vehicle 10, at block 122, and the system controller 34A determines, with the distracted driver algorithm 64 within the system controller 34A and data from the occupant monitoring system 50 that the driver 56 of the vehicle 10 remains distracted, at block 124, then, moving to block 126, the method 100 further includes displaying, with the system controller 34A, on each one of the plurality of passenger HMIs 52A, 52B, a message 78 indicating that the driver 56 of the vehicle 10 is distracted.

When the system controller 34A determines, with data from the occupant monitoring system 50 that the at least one passenger 58A, 58B has interacted with the driver 56 of the vehicle 10, at block 122, then, moving to block 126, the method 100 further includes displaying, with the system controller 34A, on each one of the plurality of passenger HMIs 52A, 52B, the message 78 indicating that the driver 56 of the vehicle 10 is distracted.

When the system controller 34A determines, with data from the occupant monitoring system 50 that the at least one passenger 58A, 58B has interacted with the driver 56 of the vehicle 10, at block 122, and the system controller 34A determines, with the distracted driver algorithm 64 within the system controller 34A and data from the occupant monitoring system 50 that the driver 56 of the vehicle 10 is no longer distracted, at block 124, then, moving to block 128, the method 100 further includes restoring the quality of audio and video output from all of the plurality of passenger HMIs 52A, 52B.

In an exemplary embodiment, the actuating the plurality of passenger HMIs 52A, 52B to engage the at least one passenger 58A, 58B and encourage the at least one passenger 58A, 58B to engage with the driver 56 of the vehicle 10 at block 108, further includes, after displaying, with the system controller 34A, on each one of the plurality of passenger HMIs 52A, 52B, a message 78 indicating that the driver 56 of the vehicle 10 is distracted at block 126 further includes, moving to block 130, monitoring the driver 56 and the at least one passenger 58A, 58B with the occupant monitoring system 50.

When the system controller 34A determines, with data from the occupant monitoring system 50 that the at least one passenger 58A, 58B has interacted with the driver 56 of the vehicle 10 at block 132, and the system controller 34A determines, with the distracted driver algorithm 64 within the system controller 34A and data from the occupant monitoring system 50 that the driver 56 of the vehicle 10 remains distracted at block 134, the method 100 further includes, moving to block 136, pausing, with the system controller 34A, audio and video output from each one of the plurality of passenger HMIs 52A, 52B.

When the system controller 34A determines, with data from the occupant monitoring system 50 that the at least one passenger 58A, 58B has not interacted with the driver 56 of the vehicle 10 at block 132, the method 100 further includes, moving to block 136, pausing, with the system controller 34A, audio and video output from each one of the plurality of passenger HMIs 52A, 52B.

When the system controller 34A determines, with data from the occupant monitoring system 50 that the at least one passenger 58A, 58B has interacted with the driver 56 of the vehicle 10 at block 132, and the system controller 34A determines, with the distracted driver algorithm 64 within the system controller 34A and data from the occupant monitoring system 50 that the driver 56 of the vehicle 10 is no longer distracted at block 134, the method 100 further includes, moving to block 138, removing the message 78 indicating that the driver 56 of the vehicle 10 is distracted and resuming audio and video output from all of the plurality of passenger HMIs 52A, 52B.

In another exemplary embodiment, the actuating the plurality of passenger HMIs 52A, 52B to engage the at least one passenger 58A, 58B and encourage the at least one passenger 58A, 58B to engage with the driver 56 of the vehicle 10 at block 108, further includes, after pausing, with the system controller 34A, audio and video output from each one of the plurality of passenger HMIs 52A, 52B at block 136, moving to block 140, monitoring the driver 56 and the at least one passenger 58A, 58B with the occupant monitoring system 50.

When the system controller 34A determines, with data from the occupant monitoring system 50 that the at least one passenger 58A, 58B has interacted with the driver 56 of the vehicle 10 at block 142, and the system controller 34A determines, with the distracted driver algorithm 64 within the system controller 34A and data from the occupant monitoring system 50 that the driver 56 of the vehicle 10 remains distracted at block 144, then, the method 100 further includes, moving to block 146, providing, with the system controller 34A, via at least one haptic alert device 54 within the vehicle 10, a haptic alert for the at least one passenger 58A, 58B.

When the system controller 34A determines, with data from the occupant monitoring system 50 that the at least one passenger 58A, 58B has not interacted with the driver 56 of the vehicle 10 at block 142, then, the method 100 further includes, moving to block 146, providing, with the system controller 34A, via at least one haptic alert device 54 within the vehicle 10, a haptic alert for the at least one passenger 58A, 58B.

When the system controller 34A determines, with data from the occupant monitoring system 50 that the at least one passenger 58A, 58B has interacted with the driver 56 of the vehicle 10 at block 142, and the system controller 34A determines, with the distracted driver algorithm 64 within the system controller 34A and data from the occupant monitoring system 50 that the driver 56 of the vehicle 10 is no longer distracted at block 144, then, the method 100 further includes, moving to block 148, resuming audio and video output from all of the plurality of passenger HMIs 52A, 52B and removing the message 78.

In an exemplary embodiment, the method 100 further includes providing, with the system controller 34A, the haptic alert continuously until the system controller 34A determines, at block 144, with the distracted driver algorithm 64 within the system controller 34A and data from the occupant monitoring system 50 that the driver 56 of the vehicle 10 is no longer distracted.

A system and method of the present disclosure offers the advantage of utilizing human machine interfaces within a vehicle to engage passengers within the vehicle to engage with a distracted driver.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of utilizing human machine interfaces within a vehicle to engage at least one passenger within the vehicle when a driver of the vehicle is distracted, comprising:
    modifying, with a system controller in communication with a plurality of passenger human machine interfaces (HMI), a display screen of a front seat passenger HMI to make the display screen of the front seat passenger HMI visually unclear to a driver of the vehicle;
    monitoring, with an occupant monitoring system in communication with a plurality of onboard sensors within the vehicle and the system controller, the driver of the vehicle and the at least one passenger within the vehicle;
    determining, with a distracted driver algorithm within the system controller and data from the occupant monitoring system that the driver of the vehicle is distracted, and, when the driver of the vehicle is distracted, actuating the plurality of passenger HMIs to engage the at least one passenger and encourage the at least one passenger to engage with the driver of the vehicle;
    determining, with the distracted driver algorithm within the system controller and data from the occupant monitoring system that the driver of the vehicle is distracted by the display screen of the front seat passenger HMI; and
    when the driver is distracted by the display screen of the front seat passenger HMI, modifying audio output from the front seat passenger HMI to reduce the driver's ability to hear the audio output from the front seat passenger HMI.

2. The method of claim 1, further including:
    after modifying audio output from the front seat passenger HMI to reduce the driver's ability to hear the audio output from the front seat passenger HMI, one of:
    determining, with the distracted driver algorithm within the system controller and data from the occupant monitoring system that the driver of the vehicle is distracted by the display screen of the front seat passenger HMI, and actuating the plurality of passenger HMIs to engage the at least one passenger and encourage the at least one passenger to engage with the driver of the vehicle; or
    determining, with the distracted driver algorithm within the system controller and data from the occupant monitoring system that the driver of the vehicle is no longer distracted by the display screen of the front seat passenger HMI, and restoring audio output from the front seat passenger HMI.

3. The method of claim 2, wherein the actuating the plurality of passenger HMIs to engage the at least one passenger and encourage the at least one passenger to engage with the driver of the vehicle further includes reducing the quality of audio output and video output from all of the plurality of passenger HMIs.

4. The method of claim 3, wherein the actuating the plurality of passenger HMIs to engage the at least one passenger and encourage the at least one passenger to engage with the driver of the vehicle further includes, after reducing the quality of audio and video output from all of the plurality of passenger HMIs:
    monitoring the driver and the at least one passenger with the occupant monitoring system; and
    displaying, with the system controller, on each one of the plurality of passenger HMIs, a message indicating that the driver of the vehicle is distracted when one of:
        the system controller determines, with data from the occupant monitoring system that the at least one passenger has interacted with the driver of the vehicle, and the system controller determines, with the distracted driver algorithm within the system controller and data from the occupant monitoring system that the driver of the vehicle remains distracted; or
        the system controller determines, with data from the occupant monitoring system that the at least one passenger has not interacted with the driver of the vehicle.

5. The method of claim 4, further including restoring the quality of audio and video output from all of the plurality of passenger HMIs when the system controller determines, with data from the occupant monitoring system that the at least one passenger has interacted with the driver of the vehicle, and the system controller determines, with the distracted driver algorithm within the system controller and data from the occupant monitoring system that the driver of the vehicle is no longer distracted.

6. The method of claim 4, the actuating the plurality of passenger HMIs to engage the at least one passenger and encourage the at least one passenger to engage with the driver of the vehicle further includes, after displaying, with the system controller, on each one of the plurality of passenger HMIs, a message indicating that the driver of the vehicle is distracted:

monitoring the driver and the at least one passenger with the occupant monitoring system; and pausing, with the system controller, audio and video output from each one of the plurality of passenger HMIs when one of:

the system controller determines, with data from the occupant monitoring system that the at least one passenger has interacted with the driver of the vehicle, and the system controller determines, with the distracted driver algorithm within the system controller and data from the occupant monitoring system that the driver of the vehicle remains distracted; or the system controller determines, with data from the occupant monitoring system that the at least one passenger has not interacted with the driver of the vehicle.

7. The method of claim 6, further including removing the message indicating that the driver of the vehicle is distracted and resuming audio and video output from all of the plurality of passenger HMIs when the system controller determines, with data from the occupant monitoring system that the at least one passenger has interacted with the driver of the vehicle, and the system controller determines, with the distracted driver algorithm within the system controller and data from the occupant monitoring system that the driver of the vehicle is no longer distracted.

8. The method of claim 6, the actuating the plurality of passenger HMIs to engage the at least one passenger and encourage the at least one passenger to engage with the driver of the vehicle further includes, after pausing, with the system controller, audio and video output from each one of the plurality of passenger HMIs:

monitoring the driver and the at least one passenger with the occupant monitoring system; and providing, with the system controller, via at least one haptic alert device within the vehicle, a haptic alert for the at least one passenger when one of:

the system controller determines, with data from the occupant monitoring system that the at least one passenger has interacted with the driver of the vehicle, and the system controller determines, with the distracted driver algorithm within the system controller and data from the occupant monitoring system that the driver of the vehicle remains distracted; or the system controller determines, with data from the occupant monitoring system that the at least one passenger has not interacted with the driver of the vehicle.

9. The method of claim 8, further including resuming audio and video output from all of the plurality of passenger HMIs when the system controller determines, with data from the occupant monitoring system that the at least one passenger has interacted with the driver of the vehicle, and the system controller determines, with the distracted driver algorithm within the system controller and data from the occupant monitoring system that the driver of the vehicle is no longer distracted.

10. The method of claim 8, further including providing, with the system controller, the haptic alert continuously until the system controller determines, with the distracted driver algorithm within the system controller and data from the occupant monitoring system that the driver of the vehicle is no longer distracted.

11. The method of claim 1, wherein the modifying audio output from the front seat passenger HMI further includes at least one of:

reducing a volume of the audio output from a speaker of the front seat passenger HMI; or directing audio output from the speaker of the front seat passenger HMI to the front seat passenger.

12. A system for utilizing human machine interfaces within a vehicle to engage at least one passenger within the vehicle when a driver of the vehicle is distracted, comprising:

a system controller in communication with a plurality of passenger human machine interfaces (HMI) and adapted to modify a display screen of a front seat passenger HMI to make the display screen of the front seat passenger HMI visually unclear to a driver of the vehicle; and an occupant monitoring system in communication with a plurality of onboard sensors within the vehicle and the system controller and adapted to monitor the driver of the vehicle and the at least one passenger within the vehicle;

the system controller adapted to determine, with a distracted driver algorithm within the system controller and data from the occupant monitoring system that the driver of the vehicle is distracted, and, when the driver of the vehicle is distracted, to actuate the plurality of passenger HMIs to engage the at least one passenger and encourage the at least one passenger to engage with the driver of the vehicle;

the system controller is further adapted to: determine, with the distracted driver algorithm and data from the occupant monitoring system that the driver of the vehicle is distracted by the display screen of the front seat passenger HMI; and modify audio output from the front seat passenger HMI to reduce the driver's ability to hear the audio output from the front seat passenger HMI when the driver is distracted by the display screen of the front seat passenger HMI.

13. The system of claim 12, wherein, after modifying audio output from the front seat passenger HMI to reduce the driver's ability to hear the audio output from the front seat passenger HMI, the system controller is further adapted to one of: actuate the plurality of passenger HMIs to engage the at least one passenger and encourage the at least one passenger to engage with the driver of the vehicle when the system controller determines, with the distracted driver algorithm and data from the occupant monitoring system, that the driver of the vehicle is distracted by the display screen of the front seat passenger HMI; or restore audio output from the front seat passenger HMI when the system controller determines, with the distracted driver algorithm and data from the occupant monitoring system, that the driver of the vehicle is no longer distracted by the display screen of the front seat passenger HMI.

14. The system of claim 13, wherein when actuating the plurality of passenger HMIs to engage the at least one passenger and encourage the at least one passenger to engage with the driver of the vehicle, the system controller is further adapted to reduce the quality of audio output and video output from all of the plurality of passenger HMIs.

15. The system of claim 14, wherein, after reducing the quality of audio and video output from all of the plurality of passenger HMIs, the system controller is further adapted to:

monitor the driver and the at least one passenger with the occupant monitoring system, and one of:

display on each one of the plurality of passenger HMIs, a message indicating that the driver of the vehicle is distracted when the system controller determines, with data from the occupant monitoring system that the at least one passenger has interacted with the driver of the vehicle, and the system controller determines, with the distracted driver algorithm and data from the occupant monitoring system that the driver of the vehicle remains distracted; or display on each one of the plurality of passenger HMIs, a message indicating that the driver of the vehicle is distracted when the system controller determines, with data from the occupant monitoring system that the at least one passenger has not interacted with the driver of the vehicle; or restore the quality of audio and video output from all of the plurality of passenger HMIs when the system controller determines, with data from the occupant monitoring system that the at least one passenger has interacted with the driver of the vehicle, and the system controller determines, with the distracted driver algorithm and data from the occupant monitoring system that the driver of the vehicle is no longer distracted.

16. The system of claim 15, wherein, after displaying, with the system controller, on each one of the plurality of passenger HMIs, a message indicating that the driver of the vehicle is distracted, the system controller is further adapted to:

monitor the driver and the at least one passenger with the occupant monitoring system, and one of:

pause audio and video output from each one of the plurality of passenger HMIs when the system controller determines, with data from the occupant monitoring system that the at least one passenger has interacted with the driver of the vehicle, and the system controller determines, with the distracted driver algorithm and data from the occupant monitoring system that the driver of the vehicle remains distracted; or pause audio and video output from each one of the plurality of passenger HMIs when the system controller determines, with data from the occupant monitoring system that the at least one passenger has not interacted with the driver of the vehicle; or remove the message indicating that the driver of the vehicle is distracted and resume audio and video output from all of the plurality of passenger HMIs when the system controller determines, with data from the occupant monitoring system that the at least one passenger has interacted with the driver of the vehicle, and the system controller determines, with the distracted driver algorithm and data from the occupant monitoring system that the driver of the vehicle is no longer distracted.

17. The system of claim 16, wherein, after pausing, with the system controller, audio and video output from each one of the plurality of passenger HMIs the system controller is further adapted to:

monitor the driver and the at least one passenger with the occupant monitoring system, and one of:

provide, via at least one haptic alert device within the vehicle, a haptic alert for the at least one passenger when the system controller determines, with data from the occupant monitoring system that the at least one passenger has interacted with the driver of the vehicle, and the system controller determines, with the distracted driver algorithm and data from the occupant monitoring system that the driver of the vehicle remains distracted; or provide, via the at least one haptic alert device within the vehicle, a haptic alert for the at least one passenger when the system controller determines, with data from the occupant monitoring system that the at least one passenger has not interacted with the driver of the vehicle; or resume audio and video output from all of the plurality of passenger HMIs when the system controller determines, with data from the occupant monitoring system that the at least one passenger has interacted with the driver of the vehicle, and the system controller determines, with the distracted driver algorithm and data from the occupant monitoring system that the driver of the vehicle is no longer distracted.

18. The system of claim 17, wherein the system controller is further adapted to provide the haptic alert continuously until the system controller determines, with the distracted driver algorithm and data from the occupant monitoring system, that the driver of the vehicle is no longer distracted.

19. A vehicle having a system for utilizing human machine interfaces within the vehicle to engage at least one passenger within the vehicle when a driver of the vehicle is distracted, comprising:

a system controller in communication with a plurality of passenger human machine interfaces (HMI) and adapted to modify a display screen of a front seat passenger HMI to make the display screen of the front seat passenger HMI visually unclear to a driver of the vehicle; and an occupant monitoring system in communication with a plurality of onboard sensors within the vehicle and the system controller and adapted to monitor the driver of the vehicle and the at least one passenger within the vehicle;

the system controller adapted to:

determine, with a distracted driver algorithm within the system controller and data from the occupant monitoring system that the driver of the vehicle is distracted by the display screen of the front seat passenger HMI, and, modify audio output from the front seat passenger HMI to reduce the driver's ability to hear the audio output from the front seat passenger HMI when the driver is distracted by the display screen of the front seat passenger HMI;

after modifying audio output from the front seat passenger HMI to reduce the driver's ability to hear the audio output from the front seat passenger HMI, to one of:

reduce the quality of audio output and video output from all of the plurality of passenger HMIs to engage the at least one passenger and encourage the at least one passenger to engage with the driver of the vehicle when the system controller determines, with the distracted driver algorithm and data from the occupant monitoring system, that the driver of the vehicle is distracted by the display screen of the front seat passenger HMI; or restore audio output from the front seat passenger HMI when the system controller determines, with the distracted driver algorithm and data from the occupant monitoring system, that the driver of the vehicle is no longer distracted by the display screen of the front seat passenger HMI;

after reducing the quality of audio and video output from all of the plurality of passenger HMIs, to monitor the driver and the at least one passenger with the occupant monitoring system, and one of:

display, on each one of the plurality of passenger HMIs, a message indicating that the driver of the vehicle is distracted when the system controller determines, with data from the occupant monitoring system that the at least one passenger has interacted with the driver of the vehicle, and the system controller determines, with the distracted driver algorithm and data from the occupant monitoring system that the driver of the vehicle remains distracted; or display, on each one of the plurality of passenger HMIs, a message indicating that the driver of the vehicle is distracted when the system controller determines, with data from the occupant monitoring system that the at least one passenger has not interacted with the driver of the vehicle; or restore the quality of audio and video output from all of the plurality of passenger HMIs when the system controller determines, with data from the occupant monitoring system that the at least one passenger has interacted with the driver of the vehicle, and the system controller determines, with the distracted driver algorithm and data from the occupant monitoring system that the driver of the vehicle is no longer distracted;

after displaying, on each one of the plurality of passenger HMIs, the message indicating that the driver of the vehicle is distracted, to monitor the driver and the at least one passenger with the occupant monitoring system, and one of:

pause audio and video output from each one of the plurality of passenger HMIs when the system controller determines, with data from the occupant monitoring system that the at least one passenger has interacted with the driver of the vehicle, and the system controller determines, with the distracted driver algorithm and data from the occupant monitoring system that the driver of the vehicle remains distracted; or pause audio and video output from each one of the plurality of passenger HMIs when the system controller determines, with data from the occupant monitoring system that the at least one passenger has not interacted with the driver of the vehicle; or remove the message indicating that the driver of the vehicle is distracted and resume audio and video output from all of the plurality of passenger HMIs when the system controller determines, with data from the occupant monitoring system that the at least one passenger has interacted with the driver of the vehicle, and the system controller determines, with the distracted driver algorithm and data from the occupant monitoring system that the driver of the vehicle is no longer distracted; and after pausing audio and video output from each one of the plurality of passenger HMIs, to monitor the driver and the at least one passenger with the occupant monitoring system, and one of:

provide, via at least one haptic alert device within the vehicle, a haptic alert for the at least one passenger when the system controller determines, with data from the occupant monitoring system that the at least one passenger has interacted with the driver of the vehicle, and the system controller determines, with the distracted driver algorithm and data from the occupant monitoring system that the driver of the vehicle remains distracted; or provide, via the at least one haptic alert device within the vehicle, a haptic alert for the at least one passenger when the system controller determines, with data from the occupant monitoring system that the at least one passenger has not interacted with the driver of the vehicle; or resume audio and video output from all of the plurality of passenger HMIs when the system controller determines, with data from the occupant monitoring system that the at least one passenger has interacted with the driver of the vehicle, and the system controller determines, with the distracted driver algorithm and data from the occupant monitoring system that the driver of the vehicle is no longer distracted.

20. The system of claim 12, wherein, when the system controller modifies audio output from the front passenger HMI, the system controller is further adapted to at least one of:

reduce a volume of the audio output from a speaker of the front seat passenger HMI; or direct audio output from the speaker of the front seat passenger HMI to the front seat passenger.

\* \* \* \* \*